United States Patent
Li et al.

(10) Patent No.: US 10,164,231 B2
(45) Date of Patent: Dec. 25, 2018

(54) SEPARATORS FOR LITHIUM-SULFUR BATTERIES

(71) Applicants: Wen Li, El Segundo, CA (US); Ping Liu, Irvine, CA (US); Jocelyn Hicks-Garner, Venice, CA (US)

(72) Inventors: Wen Li, El Segundo, CA (US); Ping Liu, Irvine, CA (US); Jocelyn Hicks-Garner, Venice, CA (US)

(73) Assignee: HRL Laboratories, LLC, Malibu, CA (US)

( * ) Notice: Subject to any disclaimer, the term of this patent is extended or adjusted under 35 U.S.C. 154(b) by 743 days.

(21) Appl. No.: 13/760,043

(22) Filed: Feb. 5, 2013

(65) Prior Publication Data

US 2014/0217992 A1    Aug. 7, 2014

(51) Int. Cl.
| | |
|---|---|
| *H01M 2/16* | (2006.01) |
| *H02J 7/00* | (2006.01) |
| *H01M 2/14* | (2006.01) |
| *H01M 10/052* | (2010.01) |
| *H01M 10/44* | (2006.01) |

(52) U.S. Cl.
CPC ......... *H01M 2/1646* (2013.01); *H01M 2/145* (2013.01); *H01M 10/052* (2013.01); *H01M 10/44* (2013.01); *H02J 7/00* (2013.01); *H01M 2/1686* (2013.01)

(58) Field of Classification Search
CPC ................................ H01M 2/1646; H02J 7/00
USPC .......................................... 320/148; 429/144
See application file for complete search history.

(56) References Cited

U.S. PATENT DOCUMENTS

| | | | |
|---|---|---|---|
| 7,282,296 B2 | 10/2007 | Visco et al. | |
| 7,282,302 B2 | 10/2007 | Visco et al. | |
| 7,390,591 B2 | 6/2008 | Visco et al. | |
| 7,838,144 B2 | 11/2010 | Visco et al. | |
| 7,858,223 B2 | 12/2010 | Visco et al. | |

(Continued)

FOREIGN PATENT DOCUMENTS

| | | | | |
|---|---|---|---|---|
| CN | 102195020 | * | 9/2011 | .............. H01M 2/16 |
| DE | 102010024479 A1 | * | 12/2011 | .......... H01M 2/1606 |

OTHER PUBLICATIONS

Pankaj Arora and Zhengming Zhang, "Battery Separators", Chem. Rev. 2004, 104, 4419-4462.

(Continued)

*Primary Examiner* — Miriam Stagg
*Assistant Examiner* — Victoria H Lynch
(74) *Attorney, Agent, or Firm* — O'Connor & Company

(57) ABSTRACT

This invention, in some variations, provides a separator for a lithium-sulfur battery, comprising a porous substrate that is permeable to lithium ions; and a lithium-ion-conducting metal oxide layer on the substrate, wherein the metal oxide layer includes deposits of sulfur that are intentionally introduced prior to battery operation. The deposits of sulfur may be derived from treatment of the metal oxide layer with one or more sulfur-containing precursors (e.g., lithium polysulfides) prior to operation of the lithium-sulfur battery. Other variations provide a method of charging a lithium-sulfur battery that includes the disclosed separator, the charging being accomplished by continuously applying a substantially constant voltage to the lithium-sulfur battery until the battery charging current is at or below a selected current.

30 Claims, 6 Drawing Sheets

$V_2O_5$ coating layer after lithium polysulfide treatment.

(56) References Cited

U.S. PATENT DOCUMENTS

| | | | |
|---|---|---|---|
| 7,931,989 B2 | 4/2011 | Klaassen | |
| 2003/0073005 A1* | 4/2003 | Kim | H01M 4/5815 |
| | | | 429/326 |
| 2003/0082442 A1* | 5/2003 | Choi | H01M 4/0402 |
| | | | 429/137 |
| 2005/0175894 A1 | 8/2005 | Visco et al. | |
| 2009/0061288 A1 | 3/2009 | Gordon et al. | |
| 2009/0226809 A1* | 9/2009 | Vu | H01M 2/166 |
| | | | 429/220 |
| 2011/0003189 A1* | 1/2011 | Hildebrandt | H01M 2/1646 |
| | | | 429/129 |
| 2011/0104571 A1* | 5/2011 | Zhamu | H01B 1/122 |
| | | | 429/231.95 |
| 2011/0165466 A1* | 7/2011 | Zhamu | B82Y 30/00 |
| | | | 429/231.8 |
| 2011/0223486 A1* | 9/2011 | Zhang | B01D 67/0027 |
| | | | 429/247 |
| 2012/0225358 A1* | 9/2012 | Seo | H01G 9/02 |
| | | | 429/246 |
| 2012/0315384 A1* | 12/2012 | Abd Elhamid | H01M 2/145 |
| | | | 427/126.2 |
| 2013/0149567 A1* | 6/2013 | Schaefer | H01M 2/1606 |
| | | | 429/231.8 |

OTHER PUBLICATIONS

Yuriy V. Mikhaylik and James R. Akridge, "Polysulfide Shuttle Study in the Li/S Battery System", Journal of The Electrochemical Society, 151 (11) A1969-A1976, 2004.

Guangyuan Zheng et al., "Hollow Carbon Nanofiber-Encapsulated Sulfur Cathodes for High Specific Capacity Rechargeable Lithium Batteries" Nano Lett. 2011, 11, 4462-4467.

V. S. Kolosnitsyn et al., "Electrochemistry of a Lithium Electrode in Lithium Polysulfide Solutions" Russian Journal of Electrochemistry, 2008, vol. 44, No. 5, pp. 564-569.

Liwen Ji et al., "Graphene Oxide as a Sulfur Immobilizer in High Performance Lithium/Sulfur Cells" J. Am. Chem. Soc. 2011, 133, 18522-18525.

Juchen Guo et al., "Sulfur-Impregnated Disordered Carbon Nanotubes Cathode for Lithium-Sulfur Batteries" Nano Lett. 2011, 11, 4288-4294.

Ping Liu, U.S. Appl. No. 12/759,720, filed Apr. 14, 2010.

Ping Liu et al., U.S. Appl. No. 13/208,341, filed Aug. 12, 2011.

* cited by examiner

SEPARATORS FOR LITHIUM-SULFUR BATTERIES

RELATED APPLICATIONS

This patent application is related to U.S. patent application Ser. No. 12/759,720 filed Apr. 14, 2010 for "LITHIUM BATTERY STRUCTURES" and U.S. patent application Ser. No. 13/208,341 filed Aug. 12, 2011 for "LITHIUM BATTERY STRUCTURES EMPLOYING COMPOSITE LAYERS, AND FABRICATION METHODS TO PRODUCE COMPOSITE LAYERS," each of which is commonly owned with the present application and each of which is hereby incorporated by reference herein.

FIELD OF THE INVENTION

The present invention generally relates to improved lithium-sulfur electrochemical cell structures, methods of making such structures, and methods of using lithium-sulfur electrochemical devices such as batteries and fuel cells.

BACKGROUND OF THE INVENTION

Batteries based on lithium (Li) are attractive due to their high energy density compared to other commercial batteries. Lithium-ion batteries are used commercially today in computers, cell phones, and related devices. Lithium-based batteries (including lithium-ion, lithium-sulfur, and lithium-air systems) have significant potential in transportation applications, such as electric vehicles.

Battery lifetime is often a critical factor in the marketplace, especially for commercial, military, and aerospace applications. Previous methods of extending battery life include employing long-life cathode and anode materials, and restricting battery operation to avoid conditions detrimental to battery life. Examples of such detrimental conditions include high and low temperatures, high depths of discharge, and high rates. These restrictions invariably lead to under-utilization of the battery, thus lowering its effective energy density. In addition, precise control of cell temperature with aggressive thermal management on the pack level is usually required, which adds significantly to system weight, volume, and cost.

Lithium-sulfur batteries have theoretical energy densities of 2500 Wh/kg (watt-hours per kilogram), in contrast to 560 Wh/kg for lithium-ion batteries. Commercialization of lithium-sulfur batteries has been hindered by technical difficulties. When a sulfur electrode is discharged, it forms a series of polysulfides that are soluble in common battery electrolytes. The dissolved compounds can migrate to the lithium electrode, effectively creating an internal short mechanism with greatly reduced energy efficiency. Metal lithium forms dendrites during repeated cycling due to non-uniform dissolution and deposition. These dendrites are highly reactive with electrolytes and can even penetrate the separator to create internal shorting. The impact of this shorting is a reduction of cycle life, energy density and cycling efficiency, as the polysulfides continue to build on the anode, and sulfur is lost from the cathode to the anode.

It has proven difficult to maintain electrical isolation of the anode and cathode, while at the same time, provide lithium-ion conduction that will not limit the power performance of the battery cell. A successful battery separator layer should have a wide electrochemical stability window to be stable against the battery anode and cathode. In addition, the separator layer needs to have limited electronic conductivity in order to prevent electrical leakage between the two electrodes. When both requirements are imposed, the available materials and techniques are very limited.

The formation of lithium dendrites at the anode can also limit the cycle life of a lithium sulfur battery by driving up the cell resistance. If the current density is not uniform across the surface of the lithium anode, lithium can be preferentially deposited in the areas with the highest current density. Deposition in these areas exacerbates the current density non-uniformity which propagates the formation of lithium dendrites on the anode. As the number of dendrites on the surface of the anode increases, the cell resistance increases, limiting the power performance of the cell.

Prior approaches attempting to reduce polysulfide crossover in lithium-sulfur cells include cathode nanostructuring or encapsulation, electrolyte optimization (e.g., salt concentration or solvent composition), electrolyte additives (such as $LiNO_3$) to protect lithium, and dual-phase or multilayer electrolytes. None of these approaches has the potential to completely eliminate self-discharge.

In view of the foregoing shortcomings, new battery cell structures are needed to address important commercialization issues associated with lithium-sulfur batteries. What is needed in particular is a cell configuration that can stop the crossover to, and deposition of, polysulfides formed during discharge on the anode. Improved separators for lithium-sulfur batteries, and methods to make and use those improved separators, are therefore desired.

SUMMARY OF THE INVENTION

The present invention addresses the aforementioned needs in the art, as will now be summarized and further described in detail herein.

In some variations, the invention provides a separator for a lithium-sulfur battery, the separator comprising: (a) a porous substrate that is permeable to lithium ions; and (b) disposed on the substrate, a lithium-ion-conducting metal oxide layer comprising a metal oxide, wherein the metal oxide layer further includes deposits of sulfur.

In some embodiments, the deposits of sulfur are derived from treatment of the metal oxide layer with one or more sulfur-containing precursors prior to operation of the lithium-sulfur battery. The metal oxide layer may be characterized by a sulfur/metal elemental ratio from about 0.1 to about 20, for example.

In some embodiments, the metal oxide is selected from the group consisting of $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and physical or chemical combinations thereof. In certain embodiments, the metal oxide comprises $V_2O_5$.

At least a portion of the sulfur may present in polysulfide (e.g. lithium polysulfide) form, in octasulfur ($S_8$) form, or another form of sulfur. In some embodiments, the sulfur is derived from one or more polysulfides. The sulfur may be derived from a reaction between one or more sulfur-containing precursors (e.g., polysulfides) and the metal oxide, to form the deposits of sulfur.

In some embodiments, at least a portion of the deposits of sulfur is contained in pores of the metal oxide layer. In these or other embodiments, at least a portion of the deposits of sulfur is disposed on a surface of the metal oxide layer. That is, deposited sulfur may physically be present on surfaces, in pores, as intercalated sulfur within metal oxide structures, or combinations thereof. Deposited sulfur may chemically be present in absorbed, adsorbed, or chemically bonded (with a metal or metal oxide) form, or combinations thereof.

The metal oxide layer may include lithium associated with the sulfur and/or lithium intercalated in the metal oxide. The metal oxide layer is preferably non-permeable to dissolved lithium polysulfides (i.e., lithium polysulfides generated during battery operation).

The metal oxide layer may be disposed on one side of the substrate, or on both sides of the substrate. In some embodiments, the substrate is selected from polyethylene, polypropylene, polybutylene, fluorine-containing polymers, cellulose polymers, polyimides, nylons, glass fibers, alumina fibers, porous metal foils, and combinations thereof.

Certain variations provide a separator for a lithium-sulfur battery, the separator comprising: (a) a porous polymer substrate that is permeable to lithium ions; and (b) disposed on one side of the substrate, a lithium-ion-conducting metal oxide layer comprising $V_2O_5$, wherein the metal oxide layer further includes deposits of sulfur.

Some variations provide a method of fabricating a separator for a lithium-sulfur battery, the method comprising disposing, on a porous substrate that is permeable to lithium ions, a lithium-ion-conducting metal oxide layer comprising a metal oxide; and then treating the metal oxide layer with one or more sulfur-containing precursors to form deposits of sulfur on the metal oxide layer, prior to operation of the lithium-sulfur battery.

In some embodiments, the sulfur-containing precursors include polysulfides, such as lithium polysulfides. In some embodiments, the deposits of sulfur are derived from a reaction between one or more polysulfides and the metal oxide.

In some embodiments, the metal oxide layer is disposed on the porous substrate by sol-gel synthesis, simultaneously with or followed by treating the metal oxide layer with one or more sulfur-containing precursors to form deposits of sulfur on the metal oxide layer. In other embodiments, the metal oxide layer is disposed on the porous substrate by vapor deposition, simultaneously with or followed by treating the metal oxide layer with one or more sulfur-containing precursors. The metal oxide layer may be fabricated from a powder precursor, simultaneously with or followed by treating the metal oxide layer with one or more sulfur-containing precursors.

Other variations of the present invention provide a method of charging a lithium-sulfur battery comprising an anode, a cathode, an electrolyte, and a separator, the method comprising continuously applying a substantially constant voltage to the lithium-sulfur battery until the battery charging current is at or below a selected current, wherein the separator comprises: (a) a porous polymer substrate that is permeable to lithium ions; and (b) a lithium-ion-conducting metal oxide layer, comprising a metal oxide, disposed on the substrate, wherein the metal oxide layer further includes deposits of sulfur.

In some embodiments, the voltage is selected from about 2.5 V to about 3.5 V, such as about 3 V. In some embodiments, the selected current is less than 160 mA/g, such as from about 2 mA/g to about 50 mA/g, or from about 20 mA/g to about 40 mA/g.

In some embodiments of these methods, the metal oxide is selected from the group consisting of $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and physical or chemical combinations thereof. In certain embodiments, the metal oxide comprises $V_2O_5$.

Prior to charging the lithium-sulfur battery, the metal oxide layer (such as $V_2O_5$) is preferably treated with one or more sulfur-containing precursors, such as polysulfides, as described herein.

DETAILED DESCRIPTION OF EMBODIMENTS OF THE INVENTION

Figure 1:
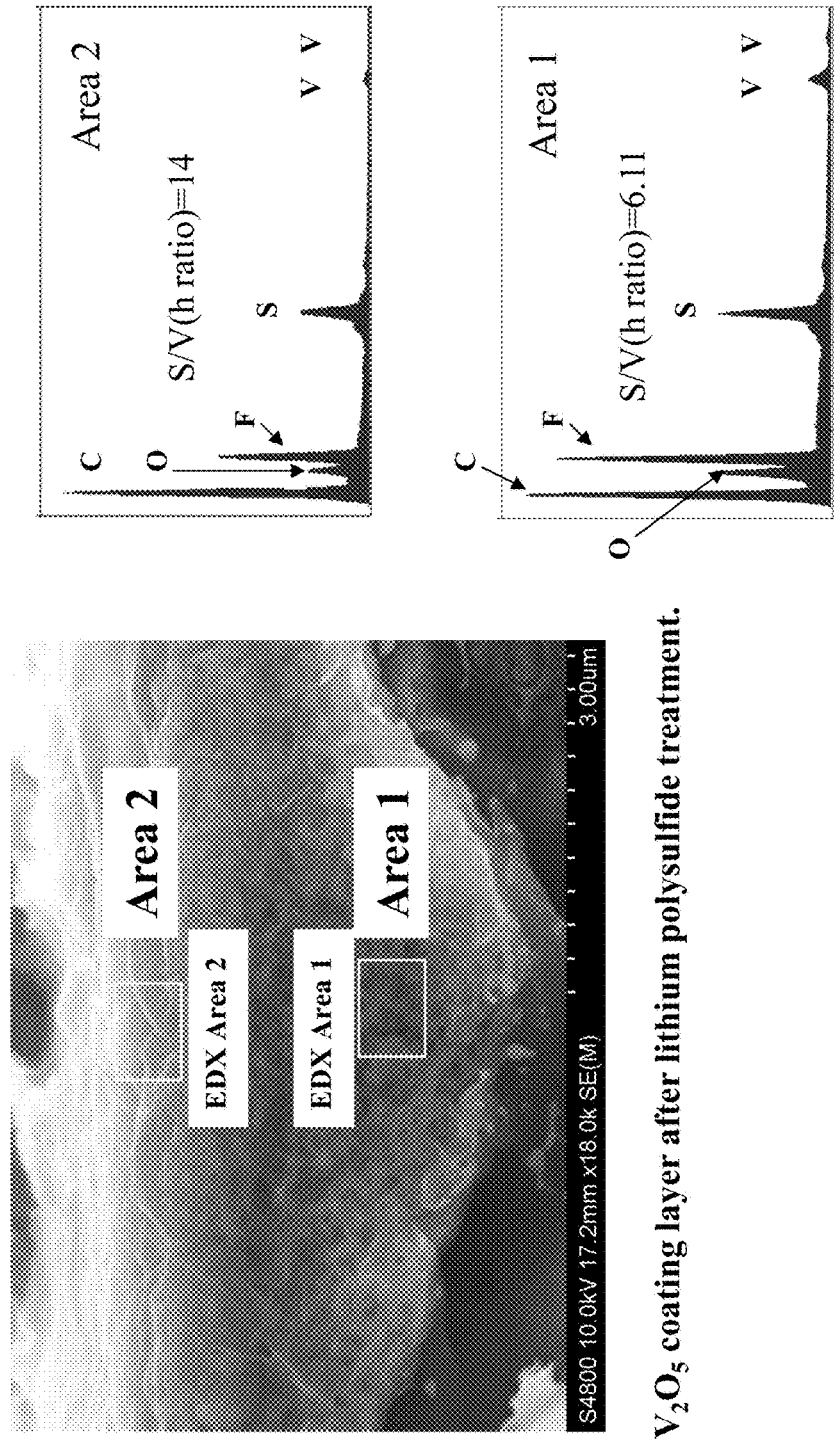
FIG. 1 shows an exemplary metal oxide layer comprising $V_2O_5$ as well as deposits of sulfur derived from treatment with lithium polysulfide, according to some embodiments of the invention.

The structures and methods of the present invention will be described in detail by reference to various non-limiting embodiments, examples, and figures. The figures provide representative illustration of the invention and are not limiting in their content. The figures are not to be construed as limiting in any way, and are not drawn to scale. It will be understood by one of ordinary skill in the art that the scope of the invention extends beyond the specific embodiments depicted.

Unless otherwise indicated, all numbers expressing dimensions, capacities, conductivities, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

As used in this specification and the appended claims, the singular forms "a," "an," and "the" include plural referents unless the context clearly indicates otherwise. For clarity, all references to a "layer" include reference to a plurality of layers, whether disposed adjacently or non-adjacently in a cell configuration. As used herein, "battery," "battery structure," "battery cell," "electrochemical cell," "galvanic cell," and the like are used interchangeably to mean one or more unit cells to convert chemical energy into electrical energy for usage or storage.

The primary functional components of a typical battery are the anode; cathode; electrolyte, in which ions move between the anode and cathode in the electrolyte; and a separator between cathode and anode to block passage of electrons (to prevent short circuiting). The active ions move from the anode to the cathode during discharge and from the cathode to the anode when charging. Current collectors, normally metal, are used during discharge to conduct electrons away from the anode, through an external circuit, and then to the cathode. During charging, current collectors conduct electrons to the anode from the cathode.

Variations of this invention provide improved separators for lithium-sulfur batteries (lithium-containing anode and sulfur-containing cathode). Some variations employ an electrically conducting inorganic layer in direct contact with, or isolated from, the sulfur cathode. The inorganic layer maintains electrical isolation of the anode and cathode, while providing lithium-ion conduction without significant polysulfide crossover.

It has been discovered that deposits of sulfur intentionally introduced to a separator layer are surprisingly effective to reduce or eliminate polysulfide crossover from the cathode to the anode, along with reducing or eliminating precipitation (at the anode) of polysulfides formed during battery discharge.

As will be described below, "deposits of sulfur" include not only elemental sulfur but also sulfur-containing compounds, such as (but not limited to) polysulfides or derivatives thereof. In certain embodiments, deposits of sulfur are derived from treatment with lithium polysulfide. As intended herein, "polysulfide" (or equivalently, "polysulfides") is intended to mean any oligomer or polymer of sulfur that is in dianionic form ($S_n^{2-}$) or is in association with another compound to form an ionic or neutral species. Polysulfides include anionic polysulfides, organic polysulfides, polysulfide salts, or other compounds including or derived from chains of sulfur.

Without being limited to any theories, deposition of sulfur within the separator layer may result in reduced porosity of the inorganic layer and further reduce polysulfide crossover. Additionally, deposition of sulfur may shift the reaction equilibrium and prevent loss of sulfur from the cathode to the separator layer, which would result in capacity fade. These characteristics tend to increase the cycle life of a lithium-sulfur cell, as well as improve the cycling efficiency of a lithium-sulfur cell (including better capacity retention).

In some variations, the invention provides a separator for a lithium-sulfur battery, the separator comprising: (a) a porous substrate that is permeable to lithium ions; and (b) disposed on the substrate, a lithium-ion-conducting metal oxide layer comprising a metal oxide, wherein the metal oxide layer further includes deposits of sulfur.

In some embodiments, the metal oxide is selected from the group consisting of $VO_x$ ($x \leq 2.5$), $MnO_x$ ($x \leq 2$), $Li_xMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and physical or chemical combinations thereof. In certain embodiments, the metal oxide comprises vanadium pentoxide, $V_2O_5$.

By "physical or chemical combinations" in the above description, it is meant that the various metal oxides may be physically combined, such as by simple blending but without chemical reaction that alters the individual stoichiometry of a particular metal oxide; or chemically combined to form a multicationic metal oxide, such as through chemical reaction or alloy formation prior to, or in connection with, formation of the metal oxide layer. Multicationic metal oxides may be of the form $M_1M_2M_3O_x$ or $LiM_1M_2M_3O_2$, where each of $M_1$, $M_2$, and $M_3$ is independent selected from Ti, V, Mn, Ni, Co, W, or Nb, for example. As just one example, the metal oxide may be $LiNi_{0.5}Co_{0.5}O_2$. Similarly, mixed metal phosphates $LiM_1M_2M_3FePO_4$ ($M_j$=Ti, V, Mn, Ni, Co, W, or Nb) may be employed.

In some embodiments, the deposits of sulfur are derived from treatment of the metal oxide layer with one or more sulfur-containing precursors prior to operation of the lithium-sulfur battery. At least a portion of the sulfur may present in polysulfide (e.g. lithium polysulfide) form, in octasulfur ($S_8$) form, or another form of sulfur. In some embodiments, the sulfur is derived from one or more polysulfides. The sulfur may be derived from a reaction between one or more sulfur-containing precursors (e.g., polysulfides) and the metal oxide, to form the deposits of sulfur.

The metal oxide layer may be characterized by a sulfur/metal elemental ratio from about 0.1 to about 20, for example. In various embodiments, the metal oxide layer (or layers) may be characterized by a sulfur/metal elemental ratio of about 0.2, 0.5, 1, 2, 3, 4, 5, 6, 7, 8, 9, 10, 11, 12, 13, 14, 15, 16, 17, 18, 19, or 20. The sulfur/metal elemental ratio may vary within the layer, including some regions that are not characterized by a sulfur/metal elemental ratio from about 0.1 to about 20. Generally, the sulfur/metal elemental ratio may vary depending on the sulfur-containing precursor (e.g. lithium polysulfide) concentration, extent of treatment, and starting porosity of the oxide layer, among other possible factors.

In some embodiments, at least a portion of the deposits of sulfur is contained in pores of the metal oxide layer. In these or other embodiments, at least a portion of the deposits of sulfur is disposed on a surface of the metal oxide layer. That is, deposited sulfur may physically be present on surfaces, in pores, as intercalated sulfur within metal oxide structures, or combinations thereof. Deposited sulfur may chemically be present in absorbed, adsorbed, or chemically bonded (with a metal or metal oxide) form, or combinations thereof.

The metal oxide layer may include lithium associated with the sulfur and/or lithium intercalated in the metal oxide. The metal oxide layer is preferably non-permeable to dissolved lithium polysulfides (i.e., lithium polysulfides generated during battery operation).

The metal oxide layer may be disposed on either side of a substrate, or on both sides of the substrate. If one side of the separator is enriched in sulfur deposits, that side preferably faces the sulfur cathode. In some embodiments, the substrate is selected from polyethylene, polypropylene, polybutylene, fluorine-containing polymers, cellulose polymers, polyimides, nylons, glass fibers, alumina fibers, porous metal foils, or combinations thereof.

Any known methods may be employed to produce deposits of sulfur in and/or on the metal oxide layer. Some embodiments employ a polysulfide treatment, such as a lithium polysulfide ($Li_2S_n$) treatment to a $V_2O_5$-coated separator layer.

An exemplary procedure for preparing liquid lithium polysulfide includes saturating a selected electrolyte (suitable for a Li—S battery) with lithium polysulfide. For example, to make 0.5 M $Li_2S_8$-saturated electrolyte, 0.23 g $Li_2S$ and 1.12 g S may be added at room temperature to 10 mL of 1 M lithium bis(trifluoromethanesulfonyl)imide (LiTFSI) in a suitable solvent, such as (but not limited to) 1,3-dioxalane (DOL), dimethyl ether (DME), 2,5-dimethylfuran, methyl sulfone, or mixtures thereof. The polysulfide solution may be diluted to a concentration of less than 0.5 M, such as about 0.02 M, 0.05 M, 0.1 M, 0.2 M, 0.3 M, or 0.4 M. The polysulfide solution may include a saturated amount of polysulfide(s).

The mixture may be stirred at room temperature until the electrolyte is saturated with $Li_2S_8$. The solution may be filtered to remove undissolved solids. To obtain a treated separator for a Li—S battery, the lithium polysulfide solution may then be applied to cover the surface of a $V_2O_5$ (or other metal oxide) coating disposed on a substrate, such as a polyolefin separator. The solution may be retained for a period of time (such as 1-10 minutes) to allow the lithium polysulfide to distribute into the $V_2O_5$ layer. In some embodiments, the solvent is removed by evaporation prior to battery fabrication. The sulfur cathode may be saturated with normal electrolyte (e.g., LiTFSI/DOL/DME) prior to applying the polysulfide-treated $V_2O_5$ separator so that it is disposed adjacent to the cathode.

FIG. 1 shows exemplary scanning electron microscopy (SEM) and energy dispersive X-ray spectroscopy (EDX) results of a $V_2O_5$ layer after treatment with lithium polysulfide solution to generate deposits of sulfur. According to the EDX elemental analysis, sulfur has penetrated into the layer with a sulfur concentration that decreases with penetration depth. The sulfur/vanadium elemental ratio is measured as about 14 in the top layer and about 6 in the bottom layer. The starting vanadium concentration is the same throughout the layer, thus indicating that the top of the $V_2O_5$ layer has more deposits of sulfur compared to the bottom of the layer.

One hypothesis (without limitation of the invention) is that the polysulfide may react with $V_2O_5$ to generate an insoluble form of sulfur, such as elemental sulfur (e.g., cyclic octatomic $S_8$). The insoluble sulfur-containing products may precipitate in the porosity of the $V_2O_5$ layer, thereby reducing its porosity. This reduction in porosity may help to prevent crossover of polysulfide generated during battery operation.

Further, it is theorized that the treatment may reduce the loss of sulfur from the cathode. Without treatment, polysulfide formed during discharge would react with $V_2O_5$ and would not likely be involved in charge-discharge operation, resulting in capacity fade. By contrast, with treatment for sulfur deposition, polysulfides formed during battery discharge would not tend to react with $V_2O_5$ since that oxide has already reacted with polysulfides during the formation of the initial sulfur deposits. Thus the polysulfides formed during battery discharge would remain available for charge-discharge cycling.

Other compounds and techniques to form deposits of sulfur in the metal oxide layer are possible. For example, a liquid or vapor sulfiding agent may be introduced, such as (but not limited to) $H_2S$, $SO_2$, methyl sulfide, dimethyl sulfide, dimethyl disulfide, di-tert-butyl disulfide, and analogues, derivatives, oligomers, polymers, reaction products, and combinations thereof. In various embodiments, sulfur may be introduced by injecting, in dissolved form or another effective form, one or more compounds selected from elemental sulfur, polysulfides, polysulfide precursors, hydrogen sulfide, dimethyl sulfide, diethyl sulfide, dimethyl disulfide, any isomers of dibutyl polysulfide (such as di-tert-butyl polysulfide), any isomers of dioctyl polysulfide, diphenyl polysulfide, dicyclohexyl polysulfide, methylthiol, ethylthiol, cysteine, cystine, methionine, potassium disulfide, cesium disulfide, and/or sodium disulfide. This list of potential sulfur-containing precursors is merely exemplary and by no means limits the scope of the invention.

As will now be further described, the principles of the invention may be applied to suppress the formation of lithium dendrites and thereby extend battery life in any lithium battery cell where the formation of lithium dendrites is a concern, such as lithium-sulfur or lithium-air cells.

In some variations, a lithium-conductive metal oxide layer is introduced into a lithium-sulfur cell separator. The metal oxide layer should be selectively permeable, permitting lithium ions to traverse the barrier without allowing polysulfides generated during the operation of the lithium-sulfur cell to cross from the cathode to the anode. The separator is preferably rigid, which can be useful in suppressing the formation and propagation of lithium dendrites.

In some embodiments, the presence of a metal oxide layer (or multiple layers) may increase the cycle life of a lithium-sulfur cell, improve the cycling efficiency of a lithium-sulfur cell, and/or reduce or eliminate the formation of dendrites at the lithium anode. In preferred embodiments, the addition of a metal oxide layer does not dramatically increase the weight of the cell, which is beneficial to retain good cell capacity. A variety of cell configurations and locations of one or more metal oxide layers are possible, as will be apparent from this disclosure.

In some embodiments, a metal oxide layer is in direct contact with a cathode. In some embodiments, a metal oxide layer is in direct contact with an anode. In these or other embodiments, a metal oxide layer is electrically isolated from the anode. In certain embodiments, a metal oxide layer is electrically isolated from both the anode and the cathode.

In some embodiments, a metal oxide layer is coated onto a "barrier substrate," such as (but not limited to) a porous polymer. The barrier substrate (or "substrate layer," or "substrate") may optionally be in direct contact with another separator or with the cathode. In certain embodiments, the metal oxide layer is coated directly onto a separator, optionally with surface modification to the separator layer.

Some variations of the invention relate to lithium-sulfur battery cells wherein at least one metal oxide layer has been introduced. It is preferred that the barrier layer does not substantially react with lithium. That is, the barrier layer is preferably chemically stable in the presence of lithium. Additionally, the barrier layer is preferably stable over the voltage range used in the lithium-sulfur cell.

In some embodiments, the metal oxide layer is non-permeable to lithium dendrites, or precursors to lithium dendrites. Lithium dendrites may form and grow at the anode, but the barrier layer should not allow the lithium dendrites to penetrate through the barrier layer to the opposite side.

Additional layers may be desirable for use in cells that will be under large amounts of mechanical stress during cycling, or that are intended to be cycled for extended periods of time. Including two metal oxide layers means that even if one of the metal oxide layers fails (e.g., due to cracks), the other metal oxide layer can still prevent polysulfides from reaching the anode side. Each of the metal oxide layers may be the same composition, although that is not necessary.

In various embodiments, the thickness of a metal oxide layer is in the range of about 0.1 µm to about 1 mm, such as about 0.3-100 µm, 1-75 µm, 0.5-50 µm, 0.4-25 µm, or 0.3-10 µm; for example, about 0.5 µm, 1 µm, 1.5 µm, 5 µm, 10 µm, 20 µm, 50 µm, 75 µm, or 100 µm. The thickness of the substrate layer may also be, in some embodiments, in the range of about 0.1 µm to about 1 mm, such as about 0.3-100 µm, 1-75 µm, 0.5-50 µm, 0.4-25 µm, or 0.3-10 µm. The desired thickness of a particular layer may be adjusted depending on the composition of the layer, to account for the properties of the layer or for economic reasons.

Certain embodiments of the invention are premised on the realization that one side of a separator may serve as an effective substrate for the metal oxide layer. That is, it is not necessary that a distinct substrate layer be present, if at least one side of the separator layer can function as, or be modified to function as, a substrate. Stated another way, in some embodiments a substrate may function as a separator, without the need for an additional separator layer. In certain embodiments, an additional separator (with or without sulfur deposits) may be present, i.e. in addition to a separator that includes a substrate and a metal oxide layer with deposits of sulfur.

In some embodiments, a lithium-sulfur battery separator, including a lithium-ion-conducting metal oxide layer, creates a divided cell architecture for the battery. A divided cell architecture may allow for different electrolytes to be present on the anode and cathode sides of the cell, if desired.

The battery cell configurations described herein are not limited to any particular method to fabricate a metal oxide layer or layers. Certain methods provided by some variations of the invention may be useful. In some embodiments, a metal oxide layer is formed by sol-gel synthesis or by vapor deposition directly onto a substrate or onto a cell separator.

The sol-gel process, also known as chemical-solution deposition, is a well-known wet-chemical technique to fabricate a metal oxide starting from a chemical solution (or "sol") that acts as the precursor for an integrated network (or "gel"). Typical precursors are metal alkoxides and metal chlorides, which undergo various forms of hydrolysis and polycondensation reactions. The precursor sol can be deposited on a substrate to form a film by any known technique, including (but not limited to) dip coating, spin coating, spraying, electrophoresis, inkjet printing, or roll coating. The sol gradually evolves towards the formation of a gel-like diphasic system containing both a liquid phase and solid phase whose morphologies range from discrete particles to continuous polymer networks. Removal of the remaining liquid (solvent) phase requires a drying process, which may be accompanied by a significant amount of shrinkage and densification.

Sol-gel synthesis in some embodiments may include the steps of forming a sol-gel comprising a selected inorganic compound, or a precursor thereof; applying, by dip-coating, a sol-gel layer comprising the sol-gel to an optionally surface-modified substrate, and then drying the sol-gel layer, to form the metal oxide layer comprising the selected inorganic compound. The surface-modified substrate may be prepared by exposing the substrate to an oxygen plasma source to etch the surface and improve adhesion of the sol-gel. Other means of etching the surface may be applied. Alternatively, or additionally, an adhesive layer may be applied to the surface, to enhance adhesion of the sol-gel. Preferably, oxygen-free and moisture-free conditions are maintained while introducing the metal oxide layer into the battery cell.

Some embodiments employ dip-coating to coat a sol-gel layer into a substrate. An exemplary dip-coating process includes immersing a substrate into a solution of the coating material at a constant speed (preferably jitter-free); pulling up the substrate and allowing a thin layer to deposit itself on the substrate while it is pulled up, wherein the speed determines the coating thickness (faster withdrawal achieves thicker coatings); draining excess liquid from the surface; and evaporating solvent to form a thin layer.

Some embodiments employ spin-coating to coat a sol-gel layer into a substrate. Spin coating is a process used to apply uniform thin films to flat substrates. An exemplary spin-coating process includes placing excess solution on a substrate, which is then rotated at high speed in order to spread the fluid by centrifugal force. Rotation is continued while the fluid spins off the edges of the substrate, until the desired thickness of the film is achieved. The applied solvent is typically volatile, and simultaneously evaporates. The higher the angular speed of spinning, the thinner the film. The thickness of the film also depends on the concentration of the solution and the solvent.

Following sol-gel synthesis, the metal oxide layer may then be treated with a sulfur-containing precursor (such as lithium polysulfides) to form deposits of sulfur, as described previously. Alternatively, or additionally, the sol-gel synthesis may be modified to introduce sulfur, or a sulfur-containing precursor, in one or more of the above steps so that sulfur deposits are added into the metal oxide.

In some variations, a lithium-ion-conducting metal oxide layer is disposed between a lithium-containing anode and a cathode by vapor deposition. Vapor deposition may be preferable when relatively thin metal oxide layers are desired, or for other reasons.

Vapor deposition includes various methods to deposit thin films by the condensation of a vaporized form of a material onto a surface. Vapor deposition generally includes chemical vapor deposition and physical vapor deposition; physical vapor deposition is preferred for the present invention (although chemical vapor deposition, or mixed chemical-physical vapor deposition, may certainly be used). Vapor deposition may include high-temperature vacuum evaporative deposition, plasma sputter bombardment, direct-current sputter deposition, cathodic arc deposition, electron beam vapor deposition, pulsed laser deposition, or any combination thereof.

The vapor deposition, in some embodiments, is pulsed direct-current sputter deposition, comprising the steps of impacting a sputtering source of a selected inorganic compound, or a precursor thereof, with a sputtering gas under vacuum to form the metal oxide layer on a substrate. In some embodiments, the sputtering source comprises a selected metal, the sputtering gas comprises an oxidant that converts the selected metal to a metal oxide, and the metal oxide layer comprises the metal oxide. Vapor deposition may form a metal oxide layer having high crystallinity, which may help the layer to be structurally rigid and continuous. Preferably, oxygen-free and moisture-free conditions are maintained while introducing the metal oxide layer into the battery cell.

Following vapor deposition, the metal oxide layer may then be treated with a sulfur-containing precursor (such as lithium polysulfides) to form deposits of sulfur, as described previously. Alternatively, or additionally, the vapor deposition may be modified to introduce sulfur, or a sulfur-containing precursor (such as a sulfur-containing gas), in one or more of the above steps so that sulfur deposits are added into the metal oxide.

The metal oxide layer may be fabricated from a powder precursor, in some embodiments. The powder may be mixed with a polymer binder (such as polyvinylidene fluoride, PVDF) dissolved in a suitable solvent. The slurry may be cast into tapes. After drying, the tapes may be hot-pressed at a temperature above the melting point of the polymer so that porosity can be reduced. The tapes may then be treated to introduce deposits of sulfur into a metal oxide layer.

The metal oxide layer may be further laminated with two porous layers to form a composite separator. These porous layers are preferably electronically resistive to help prevent an electrical short circuit. The porous layers may be fabricated from any material that is suitable as a normal separator layer known in the art. Examples include olefin polymers (e.g., polyethylene or polypropylene), fluorine-containing polymers, cellulose polymers (e.g., paper), polyimides, nylons, glass fibers, alumina fibers, and porous metal foils. The form of the porous layer may be a non-woven fabric, a woven fabric, a microporous film, a foil, or another configuration that may be selected for its mechanical strength or other properties, or for cost reasons.

The metal oxide layer should be lithium-ion-conducting, i.e., permeable to lithium ions ($Li^+$). In various embodiments, the lithium-ion conductivity of the metal oxide layer at 25° C. is from $10^{-5}$ to $10^{-2}$ S/cm, such as about 0.001, 0.002, 0.003, 0.004, 0.005, 0.006, 0.007, 0.008, 0.009, 0.01 S/cm, or higher. Preferably, the metal oxide layer is not appreciably permeable to any other chemical species during battery operation. A "chemical species" means an atom, molecule, or particle comprising at least one proton.

The metal oxide layer should not contain large pores, such as an average pore size of greater than 1 micron. That is, pores should not be available for chemical species to pass through the metal oxide layer directly (i.e., by simple pore diffusion or convection). If there are minor structural defects in the metal oxide layer introduced during battery manufacturing or operation, small amounts of chemical species (other than $Li^+$) can be expected to pass through the layer by convection through the defects.

A metal oxide layer may also be electronically conductive in addition to providing good lithium-ion conductivity. In various embodiments, the electronic conductivity of the metal oxide layer is from $10^{-2}$ to $10^2$ S/cm, such as about 0.01, 0.05, 0.1, 0.2, 0.4, 0.5, 0.6, 0.8, 0.9, 1.0 S/cm, or higher.

As will be appreciated by skilled artisans, the flexibility to select electronically conductive materials for the metal oxide layer opens up classes of materials that would not be preferred if electronic conductivity needed to be minimized. For example, anode and cathode materials can be implemented as the metal oxide layer. Known lithium-ion conductors tend to have low conductivities (~$10^{-6}$ S/cm). The ionic conductivity of battery electrode materials can reach at least $10^{-3}$ S/cm due to the orders-of-magnitude higher mobile lithium-ion concentration in the solid phase.

One advantage to high Li-ion conductivity (i.e., up to about $10^{-2}$ S/cm) is that the metal oxide layer does not need to be extremely thin, although it certainly can be thin if desired. When the metal oxide layer is relatively thick, structural rigidity is provided so that the metal oxide layer need not rely on either the anode or cathode for structural support.

In preferred embodiments, the metal oxide layer is "structurally rigid and continuous" which means that it is mechanically self-supporting in the presence of active battery materials, and that the metal oxide layer forms a coating on the substrate that covers the entire area through which active battery materials may be conveyed. During extended operation (battery charge or discharge), a structurally rigid and continuous metal oxide layer is expected to maintain good efficiency because it will not easily leak, crack, or otherwise deform. The absence of discontinuities in a continuous metal oxide layer means that reaction products (e.g., polysulfides or lithium dendrites) cannot propagate through the metal oxide layer.

The substrate for the metal oxide layer may be any suitable substrate material that can serve as a template or surface for the formation of a selected metal oxide layer. A preferred substrate is a polyolefin, such as polyethylene, polypropylene, polybutylene, or combinations thereof. A preferred separator is also a polyolefin, such as polyethylene, polypropylene, polybutylene, or combinations thereof (e.g., Celgard® separators, Celgard LLC, Charlotte, N.C., US).

Again, it is possible for a separator to provide the surface for formation of the metal oxide layer, or there may be a separate substrate, or there may be a distinct substrate for one metal oxide layer while another separator provides a surface for a second metal oxide layer, and so on.

Exemplary cathode materials suitable for the present invention include, but are not limited to, sulfur, sulfur-carbon, lithium-sulfur compounds, and combinations thereof. In some embodiments, the cathode includes sulfur that is present along with carbon nanostructures, such as carbon foam, carbon nanotubes, or other structures with a characteristic dimension in the range of about 1 nm to 100 nm. A nanostructured sulfur-carbon cathode may enhance sulfur utilization and mitigate sulfur redistribution. In some embodiments, the cathode includes a sulfur-carbon composite material along with other materials, such as various carbons. Sulfur-carbon composites may be present from 40 wt % to 100 wt %, such as from 70 wt % to 90 wt % in the cathode. In some embodiments, sulfur-carbon composites are foams with sulfur present in the foam from about 10 to 90 wt %, such as about 30-80 wt % or about 50-70 wt %.

The anode material contains lithium and preferably exhibits long cycle life and calendar life. Exemplary anode materials suitable for the present invention include, but are not limited to, carbon materials such as graphite, coke, soft carbons, and hard carbons; and metals such as Si, Al, Sn, or alloys thereof. Other exemplary anode materials include titanium oxides, germanium, copper/tin, and lithium compounds containing metal oxides, such as oxides of W, Fe, and Co.

In some embodiments, the anode material includes lithium intercalated in natural graphites, such as flaky graphite, plate-like graphite, and other types of graphite; high-temperature sintered carbon products obtained, for example, from petroleum coke, coal coke, celluloses, saccharides, and mesophase pitch; artificial graphites, including pyrolytic graphite; carbon blacks, such as acetylene black, furnace black, Ketjen black, channel black, lamp black, and thermal black; asphalt pitch, coal tar, active carbon, mesophase pitch, and polyacetylenes.

The anode, cathode, and/or the metal oxide layer may further comprise one or more conductive fillers to provide enhanced electronic conductivity. Examples of conductive fillers include, but are not limited to, conductive carbons, graphites, activated carbon fibers, non-activated carbon nanofibers, metal flakes, metal powders, metal fibers, carbon fabrics, metal mesh, and electrically conductive polymers. The anode, cathode, and/or the metal oxide layer may also further comprise other additives such as, for example, alumina, silica, and transition-metal chalcogenides.

The anode, cathode, and/or the metal oxide layer may also comprise a binder. The choice of binder material may vary widely so long as it is inert with respect to the other materials in the cathode. Useful binders are those materials, usually polymeric, that allow for ease of processing of battery electrode composites and are generally known to those skilled in the art of electrode fabrication. Examples of useful binders include, but are not limited to, polytetrafluoroethylenes, polyvinylidene fluorides, ethylene-propylene-diene rubbers, polyethylene oxides, acrylates, methacrylates, divinyl ethers, and the like. Binders may be present in concentrations of, for example, 1 wt % to 20 wt %, such as 3 wt % to 15 wt %.

Electrolytes generally include a solvent and a lithium salt (anion plus lithium cation). When different electrolytes are employed on each of the anode and cathode sides, enabled by the divided cell architecture, each electrolyte will include a solvent and a lithium salt, which may be independently selected from each other. For example, different solvents with a common lithium salt may be used. Or, a common solvent with different lithium salts may be used. Each of the solvent and lithium salt may be different on the two sides of the divided cell architecture, if desired.

Lithium salts include, but are not limited to, $LiClO_4$, $LiBF_4$, $LiPF_6$, $LiCF_3SO_3$, $LiCF_3CO_2$, $LiAsF_6$, $LiSbF_6$, $LiAlCl_4$, LiCl, LiBr, and LiI, which may be used alone or as a mixture of two or more. $LiBF_4$ and $LiPF_6$ are preferable, in some embodiments. The concentration of the salt is not particularly limited, but preferably is about 0.1 to 5 mol/L of the electrolytic solution.

Examples of electrolyte solvents include aprotic organic solvents, such as propylene carbonate, ethylene carbonate, butylene carbonate, dimethyl carbonate, diethyl carbonate, methyl ethyl carbonate, γ-butyrolactone, methyl formate, methyl acetate, 1,2-dimethoxyethane, tetrahydrofuran, 2-methyltetrahydrofuran, dimethyl sulfoxide, 1,3-dioxolane, formamide, dimethylformamide, dioxolane, dioxane, acetonitrile, nitromethane, ethyl monoglyme, phosphoric triesters, trimethoxymethane, dioxolane derivatives, sulfolane, 3-methyl-2-oxazolidinone, propylene carbonate derivatives, tetrahydrofuran derivatives, ethyl ether, 1,3-propanesultone, N-methyl acetamide, acetonitrile, acetals, ketals, sulfones, sulfolanes, aliphatic ethers, cyclic ethers, glymes, polyethers, phosphate esters, siloxanes, dioxolanes, and N-alkylpyrrolidones. As is known, minor components and impurities may be present in the electrolyte.

Current collectors collect electrical current generated and provide an efficient surface for attachment of the electrical contacts leading to the external circuit. Current collectors may be made from any suitable materials, such as (but not limited to) Al, Cu, Ni, or Au. The current collectors may also be fabricated from alloys, such as stainless steel, or from conductive polymers. Physically, the current collectors may be thin foils, such as foils with thicknesses in the 5-50 μm range. Other configurations that may be used for the current collectors include metal meshes, metal nets, perforated metal, metallized plastic films, metal grids, expanded metal grids, metal wools, woven carbon fabrics, woven carbon meshes, non-woven carbon meshes, and carbon felts.

A battery can be packaged into either prismatic format cells or cylindrical cells, for example. In the prismatic format, the stacked structure is preferably sealed with a packaging material capable of preventing air and water contamination of the battery.

Lithium-sulfur batteries can be included in a battery pack, which includes a plurality of electrochemical cells that are electrically connected in series and/or in parallel. These battery packs come in many shapes, sizes, capacities, and power ratings, depending on the intended use of the battery pack. Battery packs will typically include a thermal-management system.

Lithium-sulfur batteries according to this invention are suitable for operating across a variety of temperature ranges. Exemplary operation temperatures may be from −50° C. to 80° C., such as for military applications. For computers and related devices, as well as for electric-vehicle applications, temperatures from −30° C. to 60° C. are possible.

As a result of reduced polysulfide crossover, battery charging procedures may employ relatively small currents for extended periods of time. Such charging procedures may allow more complete charging of a Li—S cell, thereby greatly improving the cycling stability of the battery. The treatment to deposit sulfur in the separator, and the charging profile that is enabled, can improve the performance of a Li—S battery.

Variations of the present invention thus provide a method of charging a lithium-sulfur battery comprising an anode, a cathode, an electrolyte, and a separator, the method comprising continuously applying a substantially constant voltage to the lithium-sulfur battery until the battery charging current is at or below a selected current, wherein the separator comprises: (a) a porous polymer substrate that is permeable to lithium ions; and (b) a lithium-ion-conducting metal oxide layer, comprising a metal oxide, disposed on the substrate, wherein the metal oxide layer further includes deposits of sulfur.

In some embodiments of these methods, the metal oxide is selected from the group consisting of $VO_x$ (x≤2.5), $MnO_x$ (x≤2), $Li_xMn_2O_4$ (0≤x≤2), $Li_xCoO_2$ (0≤x≤1), $Li_xTiO_2$ (0≤x≤1), $Li_{3+x}Ti_5O_{12}$ (0≤x≤4), $Li_xTiS_2$ (0≤x≤1), $Li_xNiO_2$ (0≤x≤1), $Li_xV_2O_y$ (0≤x≤5, 4≤y≤5), $Li_xWO_3$ (0≤x≤0.5), $Li_xNb_2O_5$ (0≤x≤3), $Li_xFePO_4$ (0≤x≤1), $Li_xCoPO_4$ (0≤x≤1), $Li_xVPO_4$ (0≤x≤1), and physical or chemical combinations thereof. In certain embodiments, the metal oxide comprises $V_2O_5$.

In some embodiments relating to methods of charging a lithium-sulfur battery, the voltage is selected from about 2.5 V to about 3.5 V, such as about 2.6, 2.7, 2.8, 2.9, 3.0, 3.1, 3.2, 3.3, or 3.4 V. In some embodiments, the selected current is less than about 160 mA/g, such as less than about 100 mA/g or less than about 50 mA/g. In certain embodiments, the selected current is from about 2 mA/g to about 50 mA/g, or from about 20 mA/g to about 40 mA/g. Although it is preferable to continuously apply a substantially constant voltage, it should be recognized that during battery charging it is possible to semi-continuously or intermittently apply a voltage, which may be a varying voltage within the range of about 2.5 V to about 3.5 V, for example.

Example 1

In this Example 1, a Li—S coin cell battery is configured with a separator treated with lithium polysulfide.

The sulfur cathode includes 70 parts of a composite with sulfur (61.8 wt %) in carbon foam, 10 parts of $TiS_2$, 10 parts of KS6 (graphite), 10 parts of SuperP (conductive carbon black), and 10 parts of polyvinylidene fluoride (PVDF) as a binder. The electrolyte is 1M LiTFSI/DOL/DME and the separator is Celgard 3501, a porous polypropylene layer. The $V_2O_5$-coated separator is made by a spinning process from a vanadium oxide sol prepared by reacting $V_2O_5$ and $H_2O_2$ (such as described in the detailed description).

The composite with sulfur incorporated in a carbon foam is synthesized by heating sulfur to its melting point in the presence of the carbon foam. The carbon foam in turn is synthesized by pyrolysis of a porous polymer precursor as disclosed in Gross and Novak, *Langmuir*, 2010, 26, 11378, which is hereby incorporated by reference herein. The foam used in this example has a pore volume of about 5 $cm^3/g$ and is generally adjustable from about 0.5 to 6 $cm^3/g$.

In the coin cell, the active mass (sulfur) loading is about 1 $mg/cm^2$. The charge/discharge current is 100 mA/g. At the end of each charge, the voltage is held at 3 V until the current drops to about 50 mA/g to let the battery fully charge.

Figure 2:
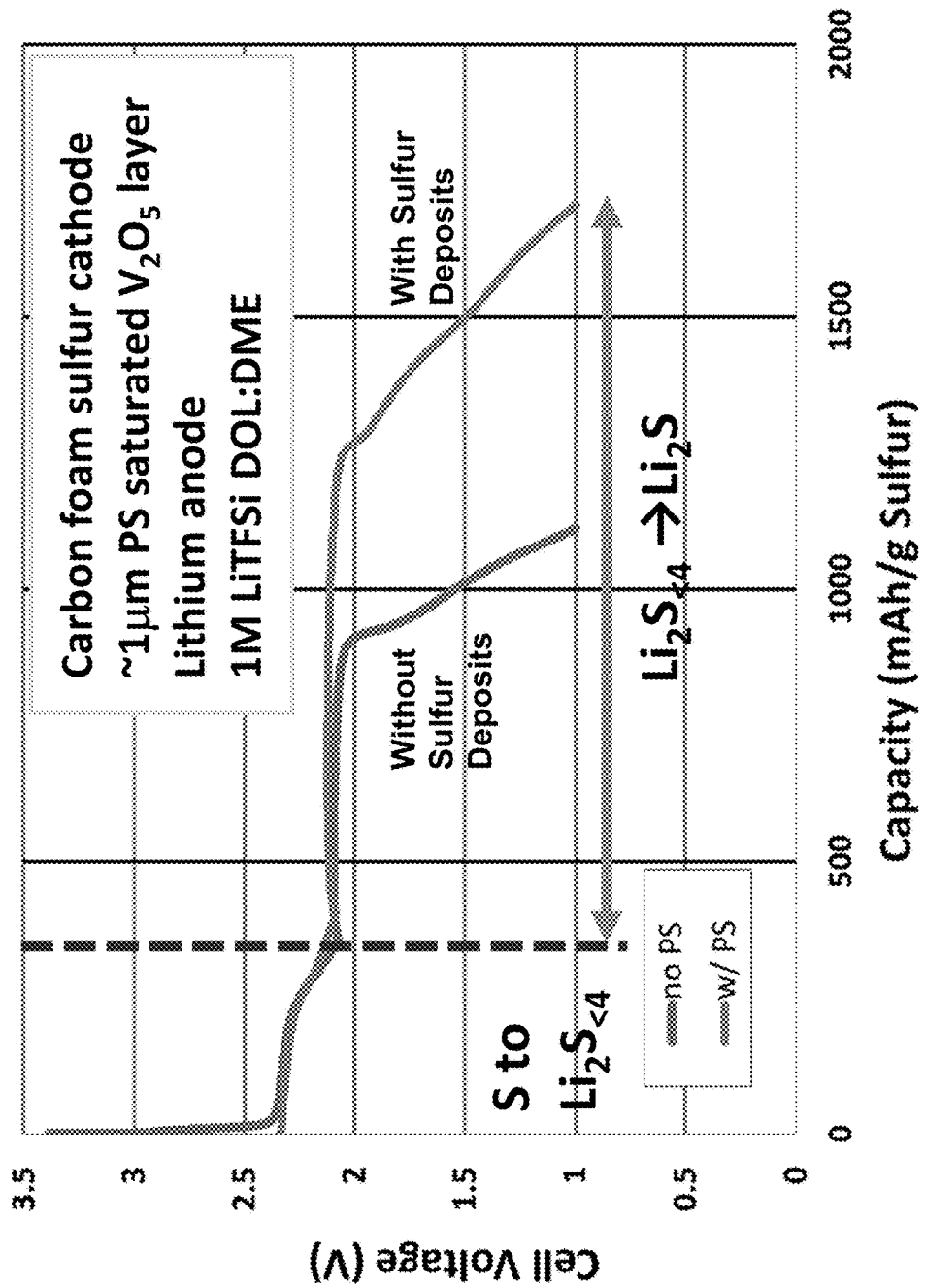
FIG. 2 shows discharge profiles of an exemplary Li—S battery with and without a lithium polysulfide-saturated $V_2O_5$ separator, according to some embodiments.

FIG. 2 shows discharge profiles of the Li—S battery with (this Example 1) and without a lithium polysulfide-saturated $V_2O_5$ separator. FIG. 2 reveals that saturating the $V_2O_5$ barrier layer improves sulfur utilization by limiting capacity loss due to redistribution. The structure enables complete discharge of the lower polysulfides, i.e. $Li_2S_n$, n<4 and better capacity retention.

Figure 3:
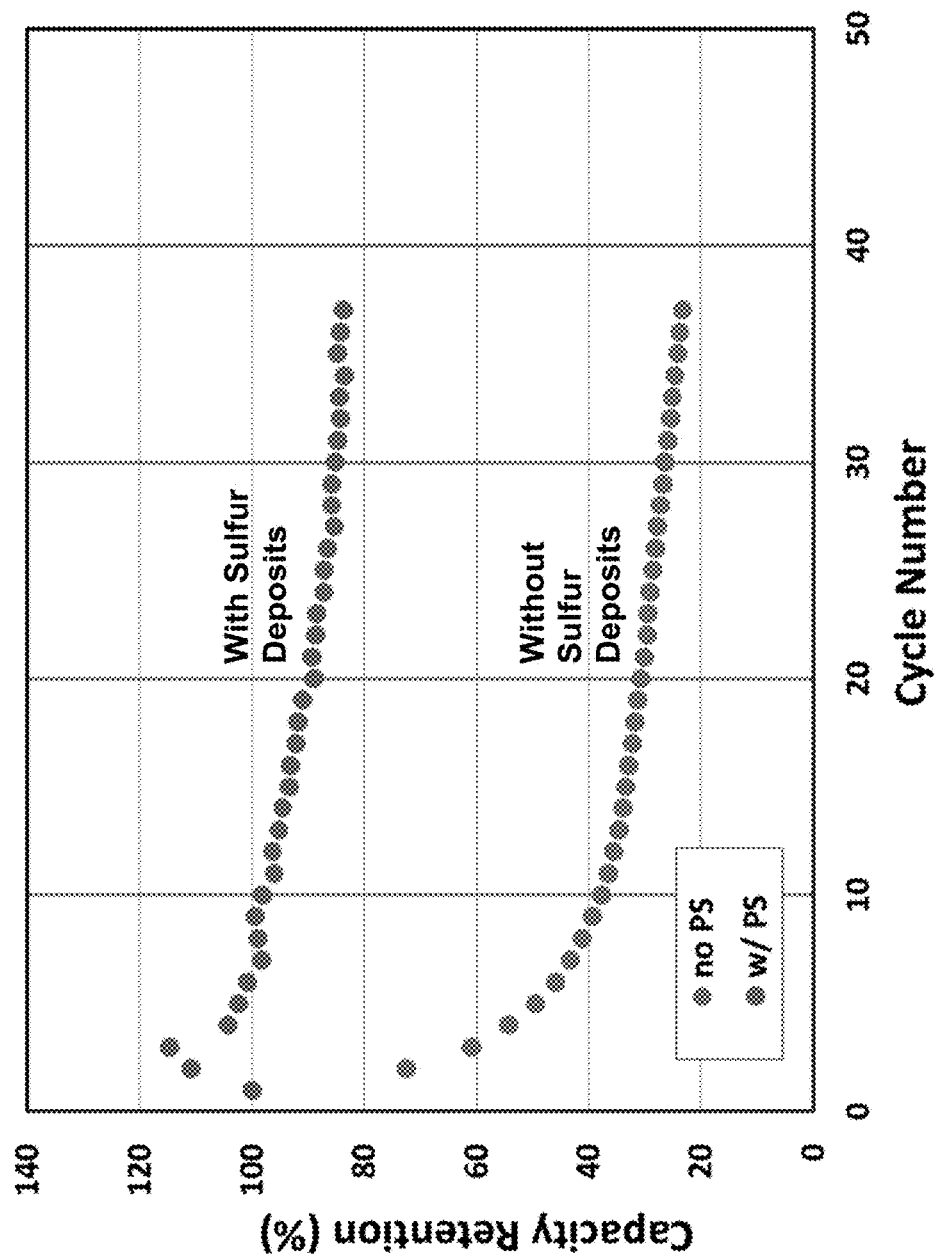
FIG. 3 shows capacity retention of an exemplary Li—S battery with and without lithium polysulfide treatment, according to some embodiments.

FIG. 3 shows capacity retention of the Li—S battery with and without the lithium polysulfide treatment. There is a dramatic effect on cycling performance of a Li—S battery when a lithium polysulfide treatment is included. The treated separator results in a capacity retention of >80% for 30 cycles, as compared to 20% for the control.

Figure 4:
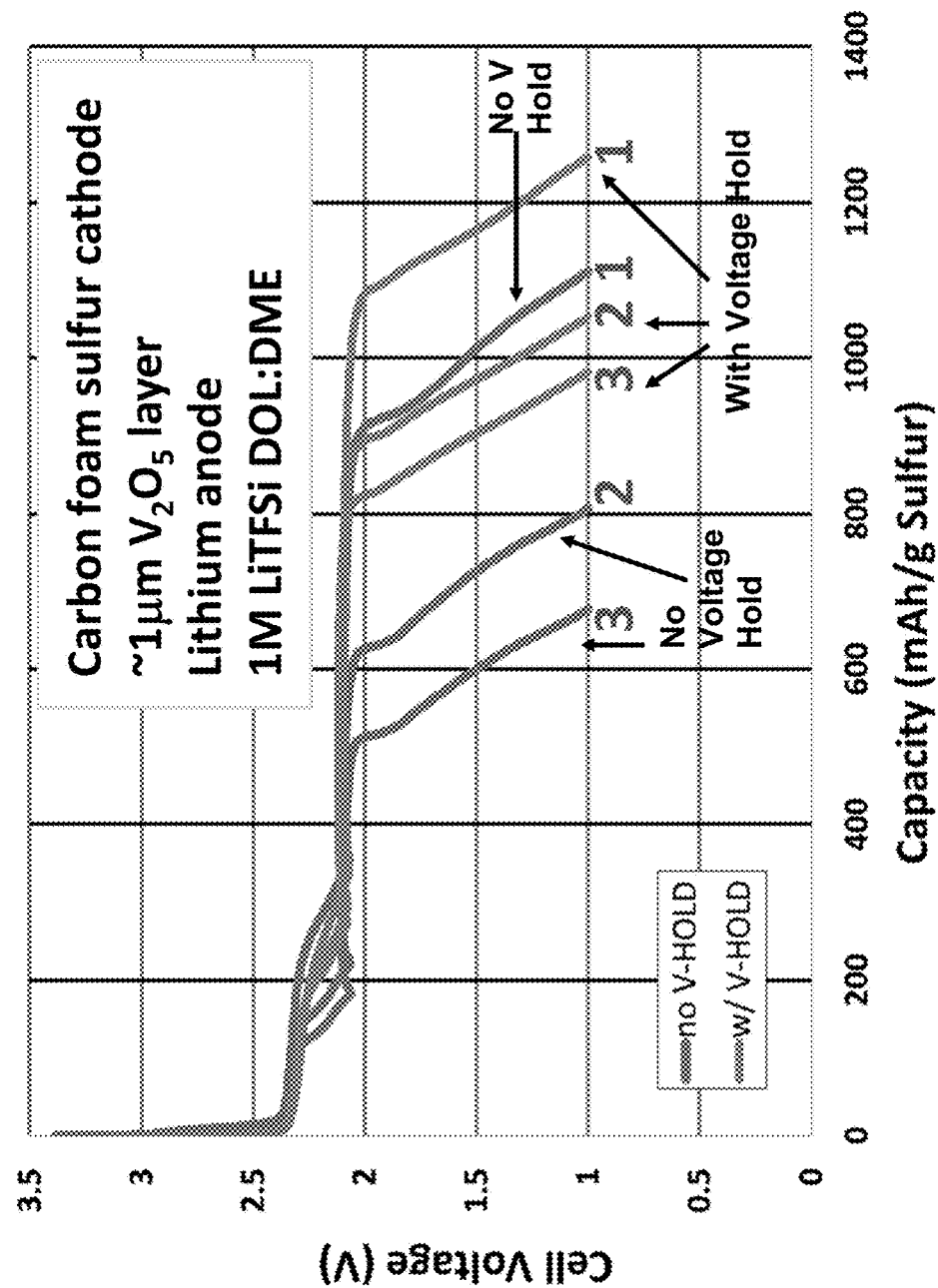
FIG. 4 shows discharge profiles for an exemplary Li—S battery with lithium polysulfide treatment, with and without voltage hold, according to some embodiments.

FIG. 4 shows the first three discharge profiles for the Li—S battery with lithium polysulfide treatment, with and without voltage hold. FIG. 4 reveals that the voltage hold dramatically reduces the capacity loss between cycles.

Figure 5:
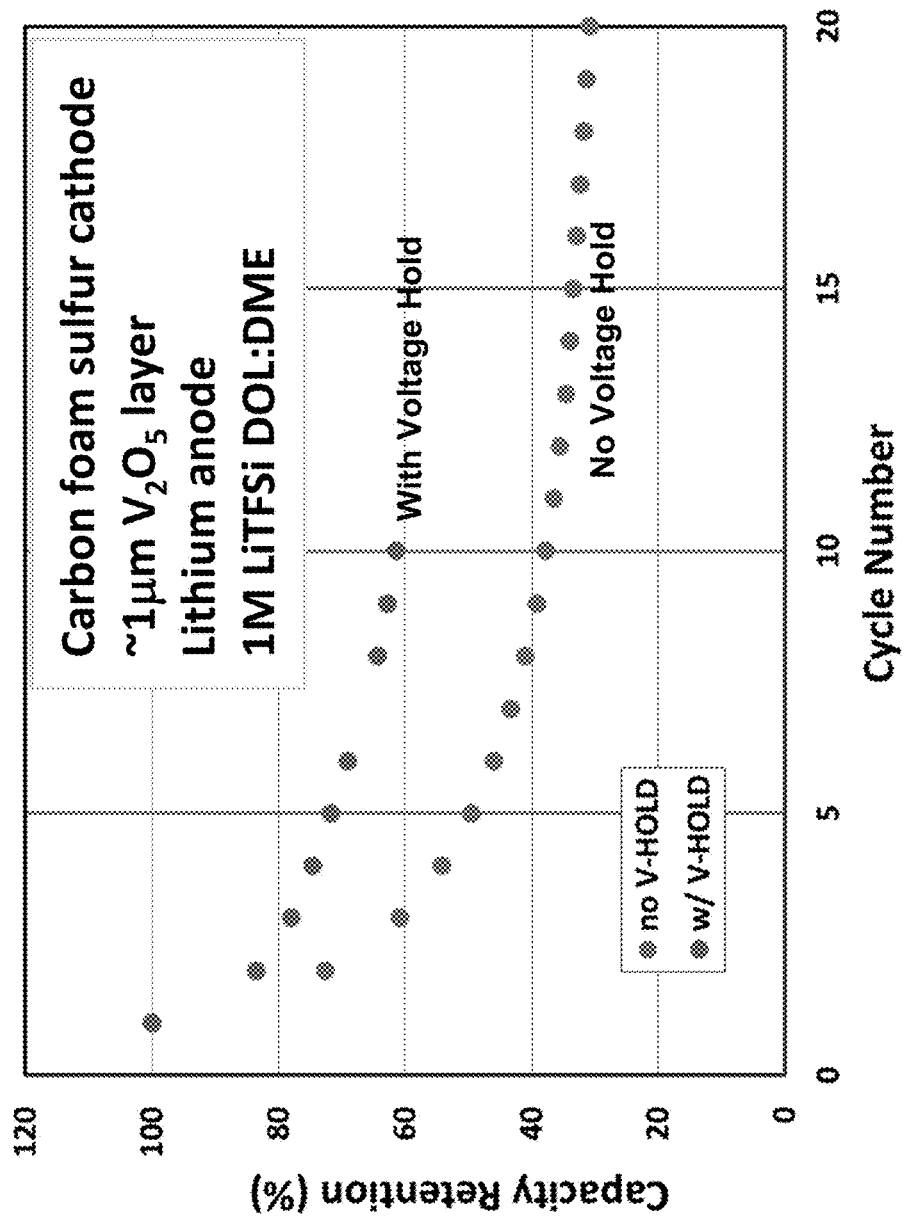
FIG. 5 shows capacity retention of an exemplary Li—S battery with lithium polysulfide treatment, with and without voltage hold, according to some embodiments.

FIG. 5 shows the capacity retention of the Li—S battery with lithium polysulfide treatment, with and without voltage hold. FIG. 5 suggests that the voltage hold enables more complete conversion of $Li_2S_n$, n>6 to elemental sulfur, resulting in greatly improved cycling stability.

Figure 6:
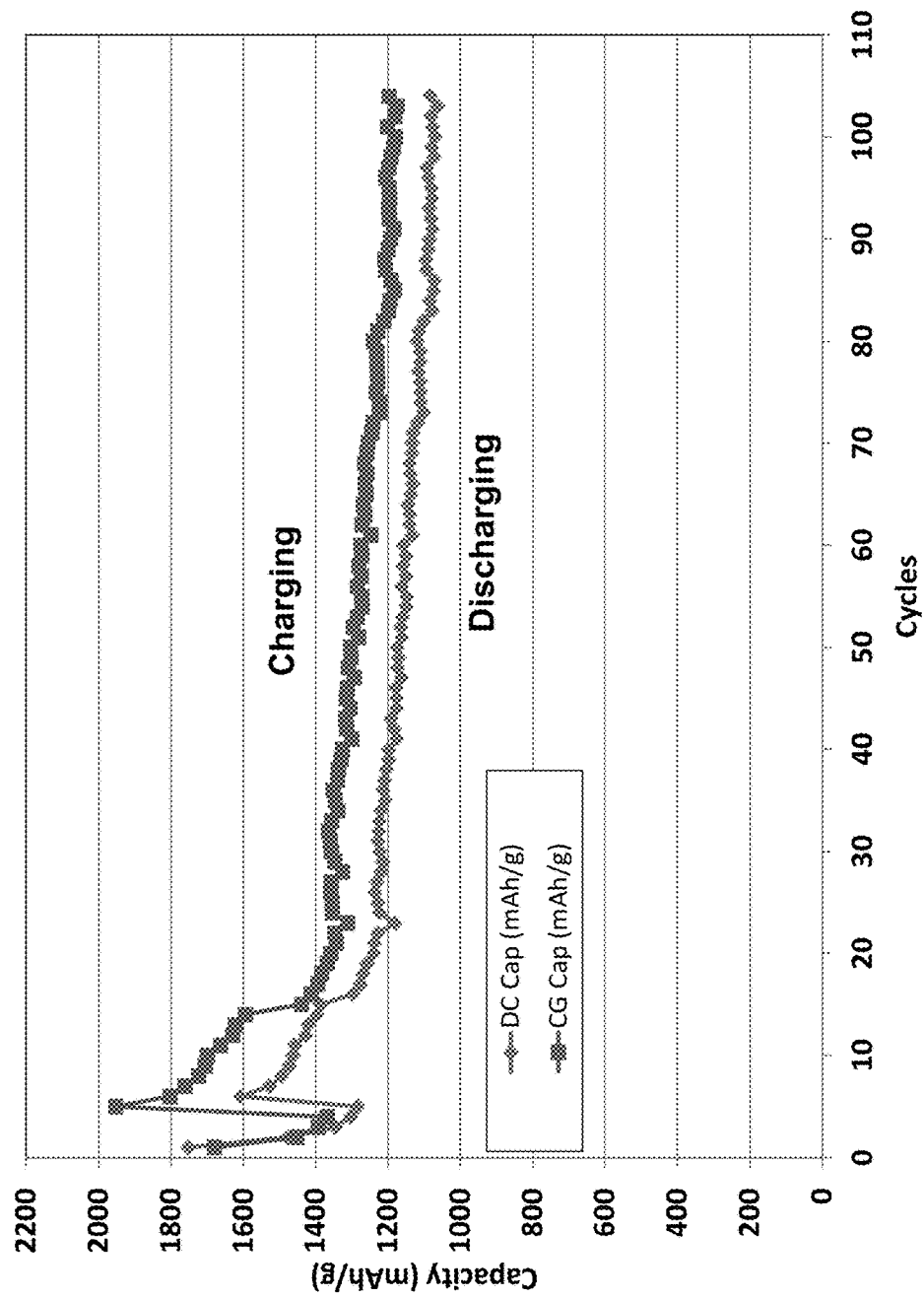
FIG. 6 shows cycle performance of an exemplary Li—S coin cell with a lithium polysulfide-treated $V_2O_5$ separator and LiTFSI/DOL/DME electrolyte, cycled at 100 mA/g and held at 3 V until the current drops to 50 mA/g, according to some embodiments.

FIG. 6 shows the cycle performance of a Li—S coin cell with the lithium polysulfide-treated $V_2O_5$ separator and LiTFSI/DOL/DME electrolyte, cycled at 100 mA/g and held at 3 V until the current drops to 50 mA/g. FIG. 6 indicates that the cell delivers over 1100 mAh/g of S capacity after 100 cycles.

Example 2

A Li anode/organic solvent-based electrolyte/nanostructured carbon-sulfur composite cathode Li—S battery contains a micrometer-scale $V_2O_5$ lithium ion-conducting layer that physically separates the anode and cathode electrolytes. Mechanical integrity of the $Li^+$ conducting layer is achieved by coating the $V_2O_5$ onto a commercial polypropylene separator. This divided cell architecture eliminates polysulfide interaction with the Li anode. Furthermore, the isolated cathode electrolyte is optimized by the intentional addition of $Li_2S_n$, which suppresses redistribution of sulfur within the carbon-sulfur composite.

A 2 cm×2 cm laboratory pouch cell of this design is cycled >200 times over ~1 year without noticeable degradation at capacities of 1025 mAh/g-sulfur.

Practical applications for this invention include, but are not limited to, aircraft, satellites, launch vehicles, electric cars, electric bikes, laptop computers, mobile phones, cameras, medical devices, and power tools. As will be appreciated by a person of skill in this art, the present invention has significant commercial relevance. Battery life is often a critical factor in the marketplace, especially for commercial, military, and aerospace applications (e.g., satellites). The current invention provides long-term benefits in battery safety, cost, and performance.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan. This invention also incorporates routine experimentation and optimization of the structures, systems, and methods described herein.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A separator for a lithium-sulfur battery, said separator comprising:
   (a) a porous substrate layer that is permeable to lithium ions; and
   (b) a lithium-ion-conducting metal oxide barrier layer comprising a metal oxide, wherein said metal oxide barrier layer is coated directly onto an outer surface of said substrate layer, wherein said metal oxide barrier layer is structurally rigid and continuous, wherein said metal oxide barrier layer further includes deposits of sulfur in polysulfide form and/or in octasulfur ($S_8$) form, wherein said deposits of sulfur are chemically bonded with said metal oxide, and wherein said metal oxide barrier layer is characterized by a sulfur/metal elemental ratio from about 0.1 to about 20,
   wherein said separator is contained in a lithium-sulfur battery with battery electrodes, wherein said separator is distinct from said battery electrodes.

2. The separator of claim 1, wherein said metal oxide is selected from the group consisting of $VO_x$ ($x \leq 2.5$), $MnO_x$ ($x \leq 2$), $LiMn_2O_4$ ($0 \leq x \leq 2$), $Li_xCoO_2$ ($0 \leq x \leq 1$), $Li_xTiO_2$ ($0 \leq x \leq 1$), $Li_{3+x}Ti_5O_{12}$ ($0 \leq x \leq 4$), $Li_xTiS_2$ ($0 \leq x \leq 1$), $Li_xNiO_2$ ($0 \leq x \leq 1$), $Li_xV_2O_y$ ($0 \leq x \leq 5$, $4 \leq y \leq 5$), $Li_xWO_3$ ($0 \leq x \leq 0.5$), $Li_xNb_2O_5$ ($0 \leq x \leq 3$), $Li_xFePO_4$ ($0 \leq x \leq 1$), $Li_xCoPO_4$ ($0 \leq x \leq 1$), $Li_xVPO_4$ ($0 \leq x \leq 1$), and physical or chemical combinations thereof.

3. The separator of claim 2, wherein said metal oxide comprises $V_2O_5$.

4. The separator of claim 1, wherein at least a portion of said sulfur is present in polysulfide form.

5. The separator of claim 1, wherein at least a portion of said sulfur is present in octasulfur ($S_8$) form.

6. The separator of claim 1, wherein at least a portion of said deposits of sulfur is contained in pores of said metal oxide barrier layer.

7. The separator of claim 1, wherein at least a portion of said deposits of sulfur is disposed on a surface of said metal oxide barrier layer.

8. The separator of claim 1, said metal oxide barrier layer further comprising lithium associated with said sulfur and/or intercalated in said metal oxide.

9. The separator of claim 1, wherein said metal oxide barrier layer is non-permeable to dissolved lithium polysulfides.

10. The separator of claim 1, wherein said metal oxide barrier layer is disposed on one side of said substrate.

11. The separator of claim 1, wherein said metal oxide barrier layer is disposed on both sides of said substrate.

12. The separator of claim 1, wherein said substrate is selected from polyethylene, polypropylene, polybutylene, fluorine-containing polymers, cellulose polymers, polyimides, nylons, glass fibers, alumina fibers, porous metal foils, and combinations thereof.

13. A method of fabricating a separator for a lithium-sulfur battery, wherein said separator is contained in a lithium-sulfur battery with battery electrodes, and wherein said separator is distinct from said battery electrodes, said method comprising coating a lithium-ion-conducting metal oxide layer, comprising a metal oxide, directly onto a surface of a porous substrate that is permeable to lithium ions; and then treating said metal oxide layer with one or more sulfur-containing precursors to form deposits of sulfur in polysulfide form and/or in octasulfur ($S_8$) form on said metal oxide layer, wherein said deposits of sulfur are chemically bonded with said metal oxide, wherein said metal oxide barrier layer is characterized by a sulfur/metal elemental ratio from about 0.1 to about 20, prior to operation of said lithium-sulfur battery.

14. The method of claim 13, wherein said sulfur-containing precursors include polysulfides.

15. The method of claim 14, wherein said sulfur-containing precursors include lithium polysulfides.

16. The method of claim 13, wherein said deposits of sulfur are derived from a reaction between one or more polysulfides and said metal oxide.

17. The method of claim 13, wherein said metal oxide layer is disposed on said porous substrate by sol-gel synthesis, simultaneously with or followed by said treating said metal oxide layer with one or more sulfur-containing precursors to form deposits of sulfur on said metal oxide layer.

18. The method of claim 13, wherein said metal oxide layer is disposed on said porous substrate by vapor deposition, simultaneously with or followed by said treating said metal oxide layer with one or more sulfur-containing precursors to form deposits of sulfur on said metal oxide layer.

19. The method of claim 13, wherein said metal oxide layer is fabricated from a powder precursor, simultaneously with or followed by said treating said metal oxide layer with one or more sulfur-containing precursors to form deposits of sulfur on said metal oxide layer.

20. A method of charging a lithium-sulfur battery comprising an anode, a cathode, an electrolyte, and a separator, said method comprising continuously applying a substantially constant voltage to said lithium-sulfur battery until the battery charging current is at or below a selected current, wherein said separator comprises:

(a) a porous polymer substrate that is permeable to lithium ions; and (b) a lithium-ion-conducting metal oxide layer, comprising a metal oxide, disposed on said substrate, wherein said metal oxide layer is coated directly onto an outer surface of said substrate layer, wherein said separator is distinct from said anode and said cathode, and wherein said metal oxide layer further includes deposits of sulfur in polysulfide form and/or in octasulfur ($S_8$) form, wherein said deposits of sulfur are chemically bonded with said metal oxide, and wherein said metal oxide barrier layer is characterized by a sulfur/metal elemental ratio from about 0.1 to about 20.

21. The method of claim 20, wherein said voltage is selected from about 2.5 V to about 3.5 V.

22. The method of claim 20, wherein said selected current is less than 160 mA/g.

23. The method of claim 22, wherein said selected current is from about 2 mA/g to about 50 mA/g.

24. The method of claim 23, wherein said selected current is from about 20 mA/g to about 40 mA/g.

25. The method of claim 20, wherein said metal oxide is selected from the group consisting of $VO_x$ (x≤2.5), $MnO_x$ (x≤2), $Li_xMn_2O_4$ (0≤x≤2), $Li_xCoO_2$ (0≤x≤1), $Li_xTiO_2$ (0≤x≤1), $Li_{3+x}Ti_5O_{12}$ (0≤x≤4), $Li_xTiS_2$ (0≤x≤1), $Li_xNiO_2$ (0≤x≤1), $Li_xV_2O_y$ (0≤x≤5, 4≤y≤5), $Li_xWO_3$ (0≤x≤0.5), $Li_xNb_2O_5$ (0≤x≤3), $Li_xFePO_4$ (0≤x≤1), $Li_xCoPO_4$ (0≤x≤1), $Li_xVPO_4$ (0≤x≤1), and physical or chemical combinations thereof.

26. The method of claim 25, wherein said metal oxide comprises $V_2O_5$.

27. The method of claim 20, said method further comprising, prior to charging said lithium-sulfur battery, treating said metal oxide layer with one or more sulfur-containing precursors.

28. The method of claim 27, wherein said sulfur-containing precursors include polysulfides.

29. The separator of claim 1, wherein said lithium-sulfur battery is not in a state of charge-discharge cycling.

30. The separator of claim 1, wherein said lithium-sulfur battery has never been charged or discharged.

* * * * *